United States Patent [19]

O'Keeffe

[11] 3,811,069

[45] May 14, 1974

[54] SIGNAL STABILIZATION OF AN ALIGNMENT DETECTION DEVICE

[75] Inventor: Terence W. O'Keeffe, Pittsburgh, Pa.

[73] Assignee: Westinghouse Electric Corporation, Pittsburgh, Pa.

[22] Filed: June 20, 1972

[21] Appl. No.: 264,699

[52] U.S. Cl......... 315/31 R, 315/21 R, 250/49.5 TE

[51] Int. Cl............................................. H01j 29/70

[58] Field of Search........................ 315/31 R, 21 R; 250/49.5 R, 49.5 TE, 49.5 E; 219/121 EB

[56] References Cited

UNITED STATES PATENTS

| | | | |
|---|---|---|---|
| 3,519,788 | 7/1970 | Hatzakis | 250/49.5 TE |
| 3,463,900 | 8/1969 | Downing | 250/49.5 R |
| 3,358,239 | 12/1967 | Franke et al. | 250/49.5 TE |

*Primary Examiner*—Maynard R. Wilbur
*Assistant Examiner*—J. M. Potenza
*Attorney, Agent, or Firm*—C. L. Menzemer

[57] ABSTRACT

A radiation beam such as an electron beam of predetermined preferably polygonal cross-section is rapidly precision aligned with a radiation detector mark of like cross-section on a member such as a resist coated substrate by measuring the radiation induced output signal from the mark. The output signal is proportional to the portion or area of the mark irradiated by the beam. The impingement of the patterned radiation beam on the member is moved in a predetermined overlapping, preferably circular or elliptic pattern over the detector mark to modulate the output signal from the mark. At least two frequency signals are extracted from the output signal and compared with a preselected alignment relationship. The over-lapping pattern is changed in position, and the comparing and changing in position repeated until the extracted frequency signals compare in the preselected relationship. Preferably the rate at which the change in position proceeds is controlled by a ratio of the two frequency signals as the preselected alignment relationship is approached.

13 Claims, 6 Drawing Figures

SIGNAL STABILIZATION OF AN ALIGNMENT DETECTION DEVICE

GOVERNMENT CONTRACT

This invention is made in the course of or under Government Contract No. N00019–71C–0066.

FIELD OF THE INVENTION

This invention relates particularly to the making of integrated circuits and other micro-miniature electronic components, and specifically to the juxtaposition of different component patterns with submicron accuracy.

BACKGROUND OF THE INVENTION

Radiation beams have been precision aligned with radiation detector marks. Stabilization of the alignment system at and near alignment and from alignment sequence to alignment sequence has however been difficult if not impossible. The alignment signal varies with the radiation level of the beam, the sensitivity of the detector mark and the gain of the electrical circuits. These variations are particularly acute in the aligning of an electron beam with a detector mark for the manufacture of micro-miniature electronic components.

Micro-miniature electronic components with resolutions of 0.5 micron and less can be mass produced by an electron image projection system (ELIPS). The electron image projection system is set forth in U.S. Pat. applications Ser. Nos. 753,373 and 869,229, filed Aug. 19, 1968 and Oct. 24, 1969, respectively, and assigned to the same assignee as the present invention. In the system, a planar photocathode produces patterned electron radiation which is directed onto a electron-sensitive layer (called an "electro-resist") on a substrate spaced from the photocathode to cause a patterned differential in solubility between the radiated and unradiated areas of the sensitive layer. The pattern in differential solubility is transferred to a pattern in a component layer or body by developing the radiation sensitive layer, and subsequently etching or doping the component layer or body through the windows developed in the sensitive layer or depositing a component layer by evaporation, sputtering, oxidizing or epitaxial growth through the windows in the sensitive layer.

The resolution of the electron image projection system is however lost in the juxtaposition of component patterns unless the same resolution can be maintained in alignment of the successive patterns. For example, making of an integrated circuit device required generally registration and irradiation of at least two to 10 different component patterns in electron-sensitive layers that are subsequently developed and transferred to an underlying component layer by etching. The electron radiation for each pattern must be aligned each time with a precision of 0.5 micron or less with respect to the first pattern. Otherwise the precisions and economies of the electron image projection system will not be attained in the integrated circuit device.

Apparatus has been developed for precise juxtaposition of multiple component patterns by electron beam induced conductivity marks (EBIC), see U.S. application Ser. No. 78,365, filed Oct. 6, 1970. A small indexing electron beam pattern or mark of predetermined cross-section is provided on the photocathode to produce the electron beam, and a well of identical cross-section is formed in an oxide layer on a substrate and overlaid with a metal layer to make the conductivity mark. A dc potential is applied across the oxide layer between the metal layer and the substrate. The current flow between the potential terminals will vary in proportion to the portion or area of the conductivity mark irradiated by the electron beam pattern. Thus the electron beam can be precisely aligned with the mark by reading the peak current corresponding to radiation of the entire conductivity mark by the electron beam. The electrical current flow may be processed through an amplifier to actuate a servo mechanism to move the photocathode or the substrate, or to change the magnetic field of focusing and deflecting electromagnets such as solenoid coils surrounding the photocathode and substrate to align and direct the electron beam pattern.

The difficulty with this alignment system is stabilization of the current signal across the oxide layer and notably in a time period which is very short compared to the "exposure" time of the resist. Generally the entire photocathode is irradiated with ultraviolet light during the alignment sequence. It is therefore imperative to the operation of the electron image projection device that the electron-sensitive layer not receive sufficient electron bombardment during alignment that significant "exposure" of the sensitive layer results. However, the electron beam induced conductivity varies widely from alignment to alignment, which in turn causes the alignment time to be variable and correct termination of an automatic alignment sequence difficult. Moreover, there is no good measure of alignment accuracy.

The speed with which alignment can be accomplished is directly dependent on the magnitude and uniformity of the current signal produced by the electron-induced conductivity mark. This signal is in turn dependent on (i) the cross-section of the mark, (ii) the electron-emission sensitivity level of the photocathode, (iii) the radiation input level to the photocathode, and (iv) the sensitivity level of the conductivity mark. However, the cross-section of the mark is the only one of these factors which can be readily controlled from alignment to alignment. The electron emission level will vary from photocathode to photocathode and with the length of use of the photocathode. The radiation input to the photocathode will vary from lamp to lamp, with the long and short history of the lamp, and with the distance of the photocathode from the lamp. And finally, the sensitivity of the conductivity mark will vary from substrate to substrate because of the change in thickness of the oxide layer, oxide doping and other factors.

The present invention provides an alignment system which is independent of these variations. It is dependent only on the cross-section of the detector mark and the predetermined dynamics of the radiation beam.

SUMMARY OF THE INVENTION

A radiation beam of predetermined preferably polygonal cross-section is precision aligned with a detector mark of like cross-section on a member. The impingement of the radiation beam on the detector mark is modulated in a predetermined, preferably circular or elliptic overlapping pattern to generate a modulated output signal proportional to the area or portion of overlap. The detector mark may be any material which alters the radiation beam or induces or changes an electrical signal so that the impingement of the beam on the mark can be quantitatively detected and analyzed as hereinafter described. Preferably the detector mark is a radiation induced conductivity mark as hereinafter more fully explained.

At least two frequency signals are extracted from the output signal from the detector mark by electrical means such as parallel pass band filters or tuned amplifiers. preferably one of the frequency signals is the fundamental frequency while the other is the harmonic corresponding in number to the number of sides of the polygonal cross-section. For example, if the radiation beam and detector mark have square or rectangular cross-sections, the fourth harmonic frequency would be extracted; or if the radiation beam and detector mark have hexagonal cross-sections, the sixth harmonic frequency would be extracted.

The relative amplitudes of the extracted frequency signals are then compared by electrical means to determine whether they match in a preselected alignment relationship. If they do not, positioning means are actuated to change the position of the overlapping pattern relative to the detector mark, and the relative amplitudes of the extracted frequency signals are again or continually compared. This sequence is repeated or continued until the frequency signals compare in the preselected relationship. Means are then actuated to terminate the alignment sequence.

Preferably additional means are provided for reducing the rate at which the positioning means changes position in proportion to the ratio of the two frequency signals as the preselected alignment relationship is approached.

The system detects when the overlapping pattern is within a prescribed tolerance of alignment with the detector mark. The error is a function solely of the cross-section of the beam and detector mark, the overlapping pattern of the beam, and the preselected alignment relationship of the extracted frequency signals. Alignment is not materially affected by variations in radiation levels of the beam, sensitivity of the detector mark, or circuit gains because the comparative frequencies are equally affected by such variations.

Other details, objects and advantages of the invention will become apparent as the following description of the presently preferred embodiments and presently preferred methods of practicing the same proceeds.

BRIEF DESCRIPTION OF THE DRAWINGS

In the accompanying drawings, the present preferred embodiments of the invention and the present preferred methods of practicing the invention are illustrated in which.

DESCRIPTION OF THE PREFERRED EMBODIMENTS

An electron image projection device suitable to practice the present invention is described, except for the electrical circuit apparatus, in U.S. Pat. application Ser. No. 78,365, filed Oct. 6, 1970, and assigned to the same assignee as the present invention. For convenience and clarity of description the device is redescribed in part here.

Figure 1:
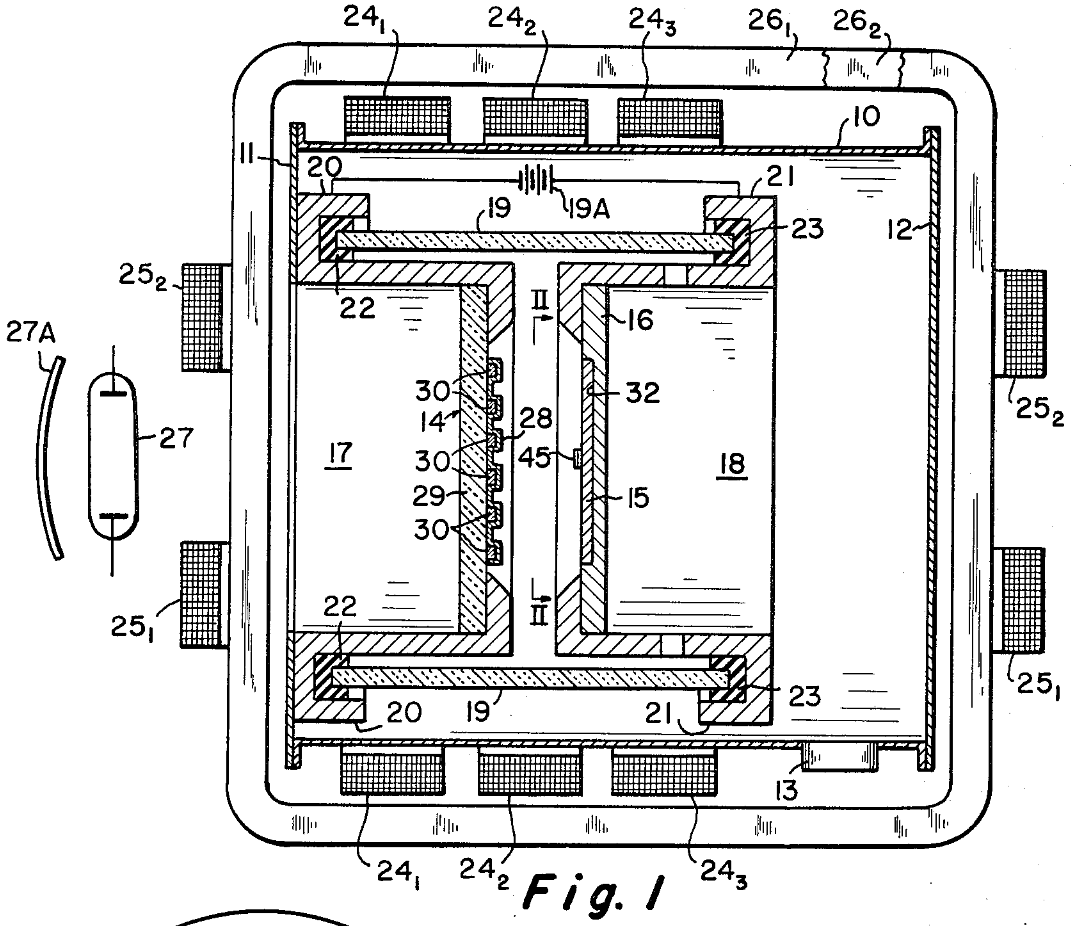
FIG. 1 is a cross-sectional view in elevation of an electron image projection device.

Referring to FIG. 1, an electron image projection device is shown. A hermetically sealed chamber 10 of nonmagnetic material has removable end caps 11 and 12 and to allow for disposition and removal of apparatus from the chamber. A vacuum port 13 is also provided in the sidewall of chamber 10 to enable a partial vacuum to be established in the chamber after it is hermetically sealed.

Disposed within chamber 10 is cylindrical electromask 14 and alignable member 15 (e.g., a semiconductor wafer) in parallel, spaced relation. Member 15 is supported in specimen holder 16 as more fully described later. Electromask 14 and holder 16 are in turn positioned in parallel array by annular disk-shaped supports 17 and 18, respectively. Electromask 14 and holder 16 are spaced apart with precision by tubular spacer 19 which engages grooved flanges 20 and 21 via gaskets 22 and 23 around the periphery of supports 17 and 18. The entire assembly is supported from end cap 11 of chamber 10 at support 17 to allow for ease of disposition of the electromask and the member within the chamber.

Electromask 14 is made cathodic and member 15 is made anodic to direct and accelerate electrons emitted from the electromask to the member 15. To accomplish this, holder 16 and supports 17 and 18 are of highly conductive material and spacer 19 is of highly insulating material. A potential 19A, of, for example -10Kv is applied between supports 17 and 18. The difference in potential is conducted to and impressed on electromask 14 and member 15 via supports 17 and 18 and holder 16.

Surrounding chamber 10 are three series of electromagnets or electro-magnetic coils, positioned perpendicular to each other, to control the impingement of the electron beam on member 15. Cylindrical electromagnets $24_1$, $24_2$ and $24_3$ are positioned axially along the path of the electron beam from electromask 14 to member 15 to cause electrons to spiral and move radially as they travel the distance from the electromask to the member. These electromagnets permit control of the rotation ($\theta$) and the magnification (M) of a patterned electron beam emitted from the electromask. Rectangular electromagnets $25_1$ and $25_2$, and $26_1$ and $26_2$ are symmetrically positioned perpendicular to each other and to electromagnets $24_1$ – $24_3$ to cause electrons to transversely deflect as they travel the distance from the electromask to the member. These electromagnets permit control of the direction (in X and Y coordinates) of a patterned electron beam emitted from the electromask.

In operation, light source 27 such as a mercury vapor lamp backed by reflector 27A irradiates a photocathode layer 28 (e.g., gold or palladium) in the electromask 14. The photocathode layer is irradiated through a substantially transparent substrate 29 such as quartz overlaid with a layer 30 containing the negative of a desired component pattern. The layer 30 is of material (e.g. titanium dioxide) which is opaque to the light radiation. The photocathode material is thus made electron emissive in a patterned electron beam corresponding to the desired component pattern. A part of the patterned electron beam emitted from the electromask 14 is at least one and preferably two relatively small electron beams 48 of predetermined cross-sections (e.g., squares of 300 × 300 microns) which are preferably positioned opposite each other along the periphery of the patterned beam.

Figures 2, 3:
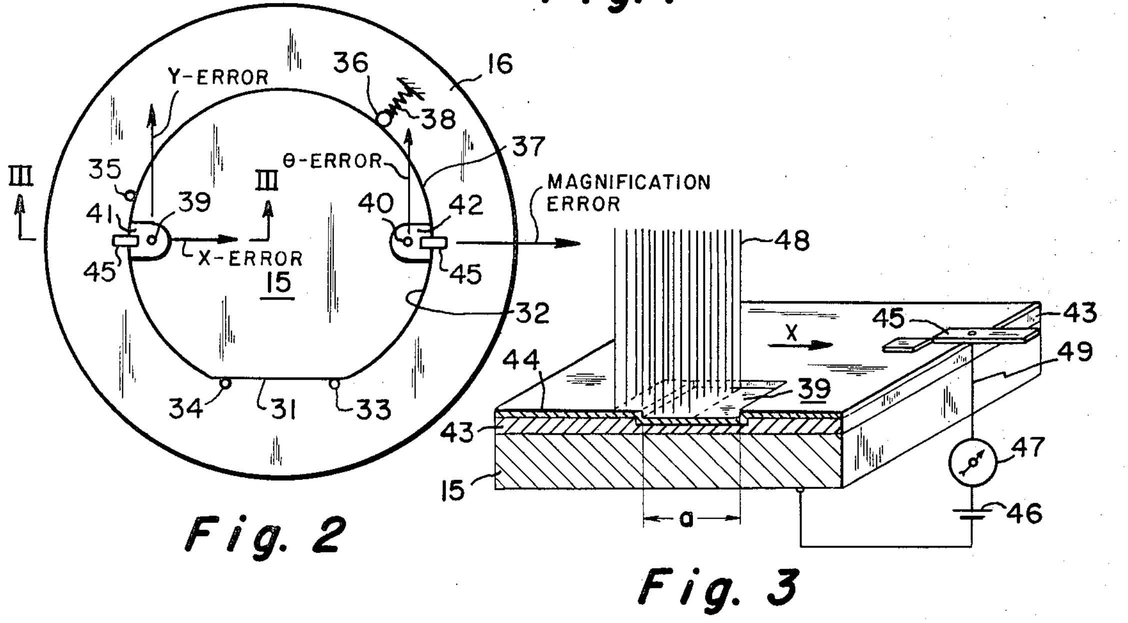
FIG. 2 is a fragmentary cross-sectional view in elevation taken along line II—II of FIG. 1.
FIG. 3 is a fragmentary cross-sectional view in perspective taken along line III—III of FIG. 2.

Referring to FIG. 2, member 15 is precision mounted within physically permissible limits in holder 16 and in turn with respect to electromask 14. Member 15 has a flat peripheral portion 31; and holder 16 has depression 32 into which member 15 fits. Holder 16 has pins 33, 34, 35 and 36 positioned in respective quadrants around the periphery of depression 32. Member 15 is positioned by resting flat peripheral portion 31 of member 15 against pins 33 and 34 and curvilinear peripheral portion 37 of member 15 against pin 35. The member is thereby located with an accuracy of about 25 microns or less. Movable pin 36, which is fitted with a compression spring 38, is positioned and pushed against the curvilinear portion of member 15 to firmly retain member 15 and in turn, maintain member 15 precisely located.

Referring particularly to FIG. 3, the details are shown of detector marks 39 and 40 embodying the electron beam induced conductivity principle and corresponding in cross-section to the predetermined cross-sections of the electron beams 48. Member 15 is provided with two conductive areas 41 and 42 containing marks 39 and 40, respectively, by first forming an oxide coating 43 of substantial thickness (e.g. greater than 1 micron for a 10 KV electron beam) and then forming wells of the predetermined cross-section in the oxide coating. The thickness of the oxide coating at the wells is less than 1 micron and preferably about 0.2 to 0.5 microns for a 10 KV electron beam. Over the oxide coating 43 is then deposited, preferably by evaporation, a substantially uniform metal layer 44 of, for example, aluminum of a thickness sufficiently thin to allow the electron beam to penetrate through it without substantial scattering and yet sufficiently thick to eliminate electron charge build-up in the oxide coating and member (e.g. about 200 Angstroms for a 10 KV electron beam).

An electrical contact 45 is attached at each conductive area 41 and 42 to metal layer 44 to make ohmic contact therewith. DC power source 46, e.g., a battery, and current flow indicator 47, e.g., ammeter or cathode ray tube, are attached in series in a circuit 49 which ohmically connects between contact 45 and the surface of member 15 opposite the conductive area 41 or 42.

In operation, the electron beams 48 of predetermined cross-section impinge on and overlap the mark 39 or 40. The electron beam induced current produced is directly proportional to area of overlap between the electron beam and the mark. Alignment can be accurately recorded simply by observing the maximum current reading from indicator 47. However, as previously explained, time limitations and quantitative variations from alignment to alignment do not permit alignment by simple indicator read-out in production.

The present invention provides a method of and apparatus for alignment within practical limits of error which is not materially affected by variations in radiation level, photosensitivity and gain. The power imput to electromagnets $\mathbf{25_1}$ and $\mathbf{25_2}$ and to electromagnets $\mathbf{26_1}$ and $\mathbf{26_2}$ are modulated in quadrature to cause electron beam 48 to move over mark 39 or 40 in a small overlapping circular path of, for example, 6 microns in diameter. The overlapping movement of the electron beam 48 in turn causes the output signal from the detector marks 39 and 40 to modulate at various frequencies consonant with the cross-sectional shape of the beam and mark and the position of the center of the circular path of the beam relative to the mark.

For example, assume a 45 Hz ac input to the electromagnets: Far from alignment (i.e., a distance greater than the radius of the circular path of beam 48) the output signal would modulate at the fundamental frequency of 45 Hz for a square electron beam. As soon as the average beam position is closer than the circular path, higher harmonic components enter into the signal while the amplitude of the fundamental decreases. Near alignment a 180 Hz signal modulation, corresponding to the fourth harmonic, appears as a result of the overlap of the corners of the square electron beam 48 with the square detector mark 39 (four per cycle), and it reads a maximum at alignment while the fundamental reduces to zero. Since both the fundamental and the fourth harmonic are similarly affected by variations in gain, radiation level and photosensitivity, their ratio is a function only of position and the predetermined cross-section of the electron beam and detector mark.

Figure 4:
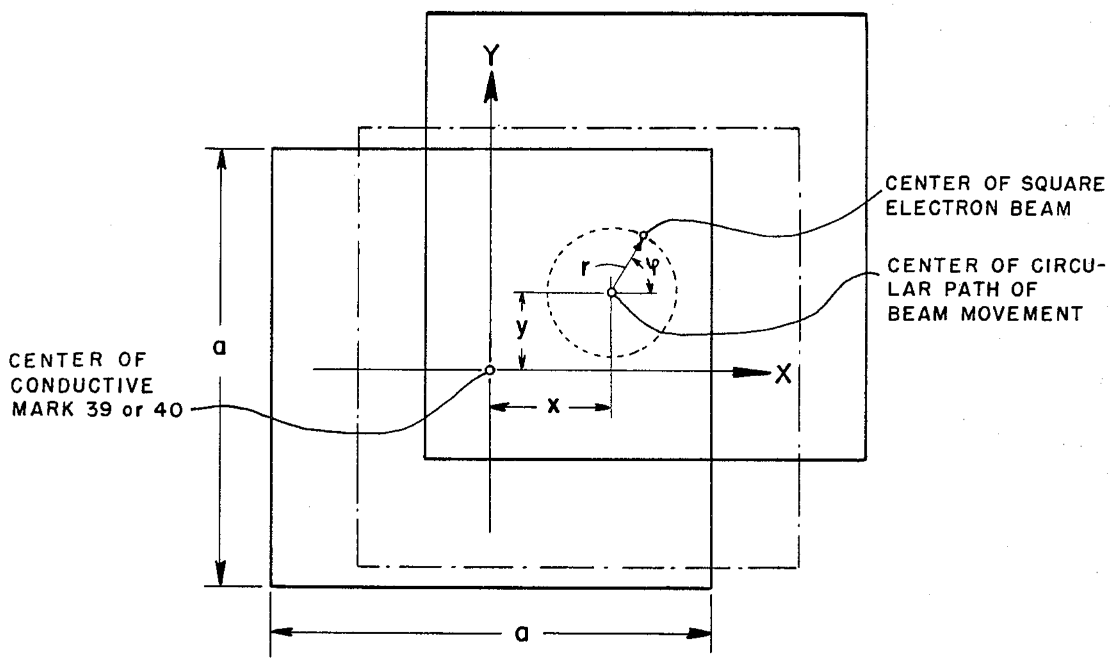
FIG. 4 is a schematic illustrating the overlapping movement of an electron beam pattern as the pattern impinges on a detector mark on a member in the electron image projection device of FIG. 1.

To further explain the invention, reference is made to FIG. 4 which schematically illustrates the overlapping relation of electron beam 48 and detector mark 39 or 40. Consider a square detector mark of side $a$ being sought by a square electron beam of the same cross-section. Let the scan of the beam position be a circle of radius $r$. At any instant, allow the center of this circle to be off-set from the center of the mark by a distance $x$ and $y$ along appropriate orthogonal axes (see FIG. 4) and the line between the center of the beam and the center of the beam movement to be at an angle $\psi$ to the $x$ axis. The area A of overlap is then given by:

$$A = a^2 - [a(y + r \sin \psi) + a(x + r \cos \psi) - (y + r \sin \psi)(x + r \cos \psi)]$$

Care should be taken in interpreting this expression since each of the terms in parentheses should always be positive because of the overlap. Bearing this in mind, the Fourier component representing the fundamental and fourth harmonic of the output signal can be extracted in the situation of interest where the radius of the circular path is *less* than either the $x$ or $y$ coordinate of the position of the center of the circular path of movement of the electron beam.

Fundamental: $A_1 = a_1 \cos \psi + b_1 \sin \psi$
where $a_1 = f_1(x,y)$, and $b_1 = f_1(y,x)$; and
where the function is:

$$f_1(u,v) = -ar + \frac{a}{\pi}[4u \sin \alpha + r(2\alpha + \sin 2\alpha)] - \frac{1}{\pi}\left[4uv \cos \gamma + ur(\cos 2\alpha + \cos 2\gamma) + r^2\left(\frac{\cos 3\alpha}{3} + \cos \alpha\right)\right],$$

where $\gamma = \cos^{-1}(-v/r)$ and $\alpha = \cos^{-1}(-u/r)$;

$x = u$ and $y = v$ for $a_1$; and $x = v$ and $y = u$ for $b_1$.

Fourth Harmonic: $A_4 = a_4 \cos 4\psi + b_4 \sin 4\psi$ where:

$a_4 = -f_{41}(x) - f'(y) - f_{42}(x) - f_{42}(y) - f_{43}(x) - f_{43}(y)$; and $b_4 = f_{44}(x,y) + f_{44}(y,x)$ where the functions are:

$f_{41}(u) = (a/\pi (u \sin 4\alpha + 2r (1/5 \sin 5\alpha + 1/3 \sin 3\alpha))$ $f_{42}(u) = (r/\pi)(2u (1/5 \cos 5\alpha - 1/3 \cos 3\alpha))$ $f_{43}(u) = (r^2/2\pi)(1/3 \cos 6\alpha - \cos 2\alpha))$ $f_{44}(u,v) = (1/\pi)(uv \cos 4\alpha - 2ur (1/5 \cos 5\gamma + 1/3 \cos 3\gamma))$ where $\gamma = \cos^{-1}(-v/r)$ and $\alpha = \cos^{-1}(-u/r)$;

$u$ = either $x$ or $y$ in $a_4$; and $u = x$ and $v = y$ and conversely $u = y$ and $v = x$ in $b_4$.

Amplitudes: Using the above expressions, the amplitude of the fundamental and fourth harmonic of the signal can be calculated. The expressions are complicated and meaningful only if evaluated for particular values of $x$, $y$ and $r$.

For $x = y = 0$: $a_1 = O$; $a_4 = (8r/15\pi)(a - 5/4\ r)$; $b_1 = 0$; and $b_4 = 0$ For $x = y = r$: $a_1 = ar + (10/3)(r^2/\pi)$; $a_4 = (2/15)(r^2/\pi)$; $b_1 = ar + (10/3)\ r/\pi$; and $b_4 = 0$ Since normally $a$ is much greater than $r$, the amplitudes at $x = y = O$ are:

$$M_{FO} = \sqrt{a_1^2 + b_1^2} = 0; \text{ and}$$

$$M_{40} = 8ar/15\pi'$$

where the first subscript of $M$ indicates the fundamental or fourth harmonic, and the second subscript indicates the value of $x$, $y$.

Likewise, the amplitudes at $x = y = r$ are $$M_{Fr} = ar\ \sqrt{2}; \text{ and}$$

$$M_{4r} = (2/15)(r^2/\pi)$$

Therefore: $M_{FO} < M_{FR}$; $M_{40} > M_{4r}$; and $M_{Fr} > M_{4r}$ That is to say, the fundamental decreases to zero as $x = y = 0$ is approached, while the fourth harmonic increases parabolically to a maximum value. Since at $x = y = r$ the fundamental is greater than the fourth harmonic, $M_{Fr}/M_{40} = 15\pi\ \sqrt{2}/8 = 8.3$, it follows that for some value of $x$ and $y$ less than $r$ the two amplitudes will be equal. A good estimate of the $x$, $y$ value at which the two signals are equal is given by $\sqrt{x^2 + y^2} = r/8.3$. Thus, if $r = 3$ micron, $\sqrt{x^2 + y^2} = 0.36$ microns. An accurate calculation gives $\sqrt{x^2 = y^2} + 0.38$ micron where $M_F = M_4$. Similarly $\sqrt{x^2 = y^2} = 0.20$ micron where $M_4 = 2M_F$.

Figure 5:
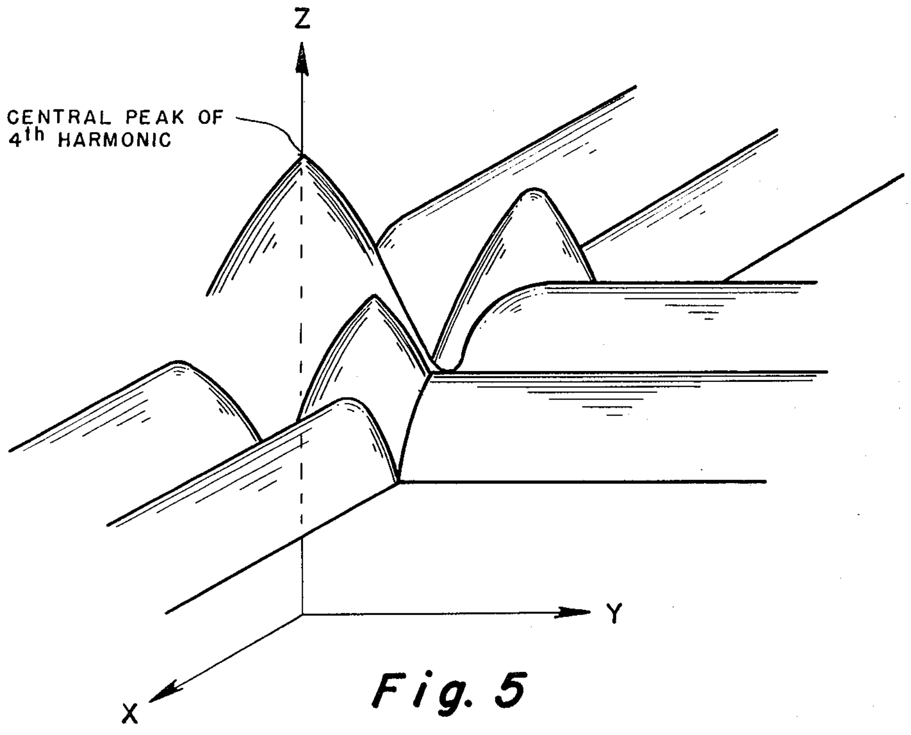
FIG. 5 is a graph showing the relative magnitude of the fourth harmonic of the current output from the detector mark where an electron beam pattern is moved as illustrated in FIG. 4 as a function of the coordinates of the center of the circular path of the electron beam movement.

The shape of the fourth harmonic response in $x$, $y$, signal space is complicated as depicted in FIG. 5. Near $x = y = 0$, the response is parabolic and relatively constant. The fundamental response in this region is essentially linear. Due to the multi-peak/valley nature of the fourth harmonic response, care should be taken to choose an unambigous region of $x$, $y$ space in which to make the comparison between the signals. No confusion will occur provided $x$ and $y$ less than $0.2r$. For $r = 3$ micron, this corresponds to $x$ and $y$ less than 0.6 micron. Since alignments to better than this accuracy are normally desirable in the electron image projection system (e.g., 0.2 microns), no practical problem arises. The values of $a$ and $r$ can be chosen to correspond to the accuracy of alignment desired provided it is consistent with noise levels present in the apparatus used.

Therefore, the method for alignment or null detection is to continuously compare the amplitudes of the fundamental and fourth harmonic content of the signal from each of the detector marks 39 and 40, and terminate the alignment sequence when a suitable relationship exists between the signals. Such a relationship could simply be fourth harmonic greater than a constant times the fundamental.

Figure 6:
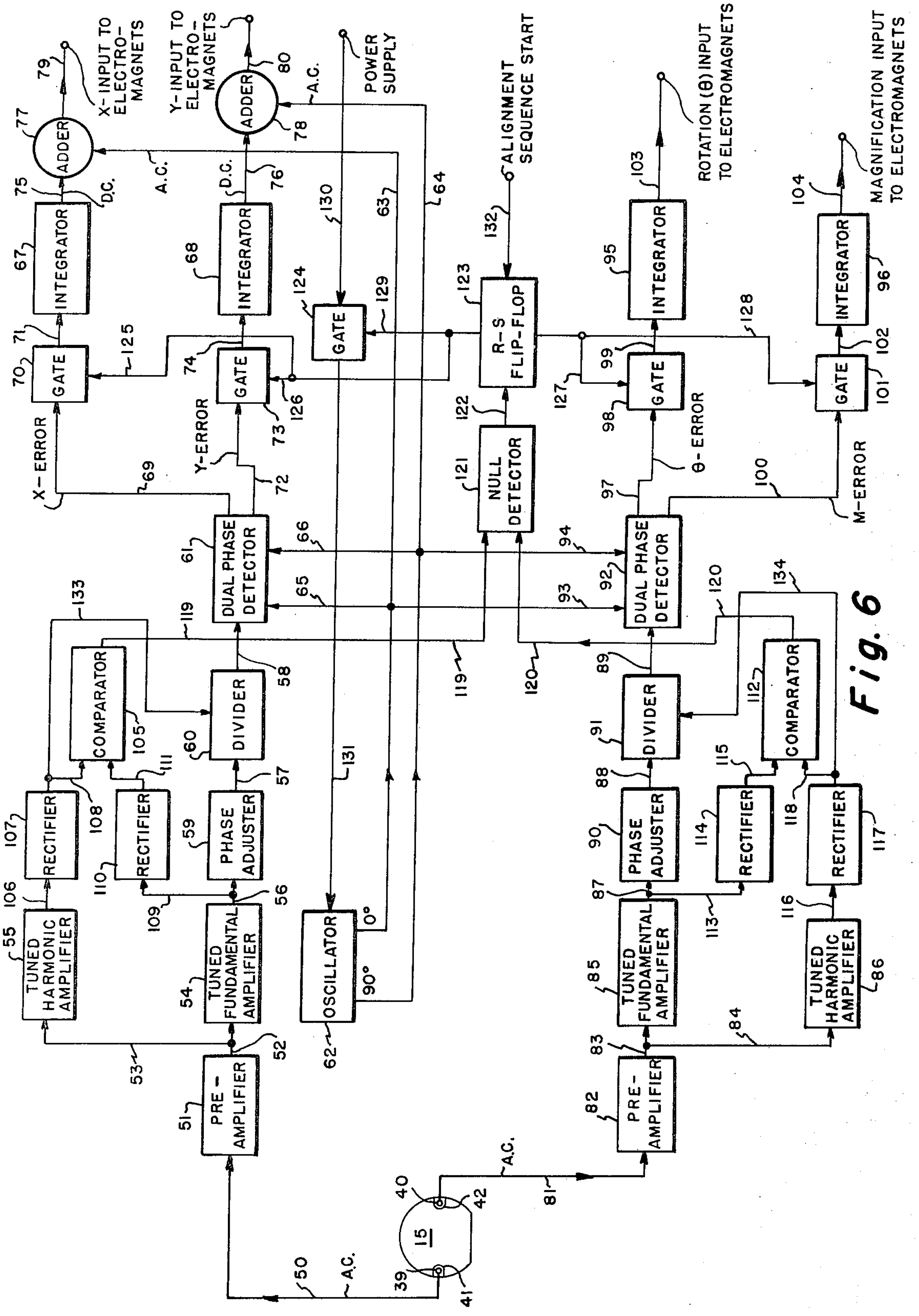
FIG. 6 is a block diagram of an electrical circuit for the electron image projection device shown in FIG. 1 to automatically align the electron beam pattern in accordance with the present invention.

Referring to FIG. 6, a block diagram of the electrical apparatus is shown to automatically align the electron beams 48 with detector marks 39 and 40.

X and Y errors are corrected by phase detecting the output from detector mark 39 with reference to the circular-path scan of electron beam 48 and extracting two d.c. signals corresponding to the X and Y errors. The X and Y error signals each operate a separate integrator or servo-mechanism which changes the power input to the electromagnets. The electron beam is thereby deflected to correct the transverse errors of alignment between beam 48 and mark 39. The alignement sequence is terminated in accordance with the present invention as previously described.

To accomplish these corrections as shown in FIG. 6, the output signal from detector mark 39 is conducted by lead 50 to preamplifier 51. Amplifier 51 increases the strength of the signal so that it can be better processed and used in the following circuit. The signal is then conducted via leads 52 and 53 to tuned amplifiers 54 and 55. Each tuned amplifier performs the combined functions of a pass-band filter and an amplifier. Amplifier 54 extracts and further amplifies the fundamental frequency of the signal, and amplifier 55 extracts and further amplifies the fourth harmonic of the signal.

The fundamental signal is used to automatically correct deflection errors in the electron beam pattern by conducting the output from tuned amplifier 54 via leads 56, 57 and 58 through phase adjuster 59 and divider circuit 60 to dual phase detector 61. Phase adjuster 59 corrects for the time-lag between the fundamental signal and the circular-path modulation signal so that the modulation of the correction signal is in the same time frame as the modulating power signal to the electromagnets. Divider circuit 60 allows the fundamental to pass through or decreases the output by the ratio of the fundamental to the fourth harmonic signal as described hereafter.

The dual phase detector 61 phase detects the fundamental signal with reference to the electron beam modulation and outputs two d.c. signals corresponding in magnitude to the X and Y coordinates of the center of scan of electron beam 48 from the center of detector mark 39. Detector 61 is a commercially available phase detector with two channels, each channel having two gates to provide for extraction of one of the error signals ($x$ or $y$). The reference coordinates or inputs are received from oscillator 62 which supplies the a.c. circular-scan modulation to the electromagnets 25 and 26 via leads 63 and 64. The inputs from oscillator 62 to phase detector 61 via leads 65 and 66 are 90° out-of-phase and are supplied to separate channels so that one channel extracts the X error and the other channel the Y error.

The X and Y outputs from detector 61 are supplied to integrators 67 and 68, respectively, via lead 69, gate 70 and lead 71, and lead 72, gate 73 and lead 74. The significance of the gates 70 and 73 will be described hereafter. Integrators 67 and 68 may be commercially available servo-mechanisms which has a given d.c. output which continuously changes as long as there is an input. The rate of change preferably is also dependent on the magnitude of the input so that the speed of correction can be slowed as alignment is approached as more fully described later. The integrators 67 and 68 thus output through leads 75 and 76 to electromagnets 25 and 26. The dc signals change in magnitude until the electron beam 47 is aligned in X-Y coordinates with detector mark 39. These outputs are supplied to the electromagnets through adders 77 and 78 and leads 79 and 80, respectively, so that the circular-scan modulation from oscillator 62 can be added to the X and Y dc inputs respectively.

Similarly, rotation ($\theta$) and magnification (M) errors are corrected by phase detecting the output from conductive mark 40 with reference to the circular-path modulation of the electron beam and extracting two d.c. signals corresponding to the $\theta$ and M errors. The $\theta$ and M error signals each operate a separate intergrator which changes the power input primarily to electromagnets $24_1$, $24_2$ and $24_3$. The power input to the electromagnets $24_n$ is such as to cause rotation of the beam about the center of member 15 or radial divergence or convergence from the center of member 15. In some instances, such rotation and magnification inputs to electromagnets $24_n$ can be coordinated with deflection inputs to electromagnets $25_n$ and $26_n$ so that, for example, the input causes the beam to rotate about mark 39 as the center. In any event, the input to the electromagnets is provided until the other electron beam 48 comes into alignment with detector mark 40. The entire electron beam pattern is thereby rotated until the center of the electron beam pattern is on a line joining the centers of detector marks 39 and 40, and is enlarged or reduced in size until the cross-section of electron beam 48 coincide with the cross-section of detector mark 40.

To accomplish these corrections as shown in FIG. 6, the output signal from detector mark 40 is conducted by lead 81 to preamplifier 82. Amplifier 82 increases the strength of the signal so that it can be better processed and used in the following circuit. The signal is then conducted via leads 83 and 84 to tuned amplifiers 85 and 86 as previously described. Amplifier 85 extracts and further amplifies the fundamental frequency of the signal, and amplifier 86 extracts and further amplifies the fourth harmonic of the signal.

The fundamental signal is used to automatically correct rotation and magnification errors in the electron beam pattern by conducting the output from tuned amplifier 85 via leads 87, 88 and 89 through phase adjuster 90 and divider circuit 91 to dual phase detector 92. Phase adjuster 90 corrects for the time-lag between the fundamental signal and the circular-path modulation signal so that the modulation of the correction signal is in the same time frame as the modulating power signal to the electromagnets. Divider circuit 91 allows the fundamental to pass through or decreases the output by the ratio of the fundamental to the fourth harmonic signal as described hereafter.

The dual phase detector 92 phase detects the fundamental signal with reference to the scan-modulation signal to the electromagnets and outputs coordinate error signals corresponding to the distance of the center of modulation of electron beam 48 from the center of detector mark 40. Detector 92 is a commercially available phase detector as previously described with two channels, each channel having two gates to provide for extraction of one of the error signals. The reference coordinates or inputs are received from oscillator 62. The inputs from oscillator 62 to phase detector 92 via leads 93 and 94 are 90° out-of-phase and are supplied to separate channels so that the errors extracted by detector 92 are orthogonally related on coordinates axis parallel to the reference coordinates of the X and Y errors previously described.

The orthogonally related outputs from detector 92 are supplied to integrators 95 and 96, respectively, via lead 97, gate 98 and lead 99, and lead 100, gate 101 and lead 102. The significance of the gates 98 and 101 will be described hereafter. Integrators 95 and 96 may be commercially available motor-driven precision potentiometers, that is to say, servo-mechanisms which have given dc outputs which continuously change as long as they have inputs to them. Integrator 95 controls the power input to the electromagnets via lead 103 so that a change in input causes the entire electron beam pattern to rotate until the two aligning beams 48 have a line joining their centers coinciding with a line joining the centers of marks 39 and 40. The input to integrator 95 therefore performs the function of correcting the rotational ($\theta$) error in the beam pattern.

Integrator 96, on the other hand, controls the power input to the electromagnets via lead 104 so that a change in input causes electron beam 48 associated with mark 40 to move either in or out along a line joining the centers of electron beams 48, until the electron beams are aligned with marks 39 and 40 respectively. The divergence or convergence of beams 48 results in a magnification or reduction in size of the entire electron beam pattern, and the input to integrator 96 therefore performs the function of correction magnification (M) error in the beam pattern.

To terminate the alignment sequence, the fundamental and fourth harmonic signals from tuned amplifiers 54 and 55 are supplied to comparator 105. The inputs made via lead 106, rectifier 107 and lead 108, and lead 109, rectifier 110 and lead 111, respectively, so that comparator 105 is comparing only the magnitude of the fundamental and fourth harmonic signals. Comparator 105 is a commercially available device which compares the two dc inputs and provides an output where the input magnitudes are a predetermined multiple of each other, e.g., are equal.

Likewise, the fundamental and fourth harmonic signals from tuned amplifiers 85 and 86 are supplied to comparator 112. Again the input is made via lead 113, rectifier 114 and lead 115, and lead 116, rectifier 117 and lead 118, respectively, so that comparator 112 is comparing only the magnitude of the fundamental and fourth harmonic signals. Comparator 112 is the same as comparator 105, and compares the two dc inputs and provides an output when the input magnitudes are a predetermined multiple of each other.

Given the circular-scan modulation and the size of marks 39 and 40, the error factor of the alignment system is predetermined by the multiple with which comparators 105 and 112 are relating the fundamental and fourth harmonic inputs. This can best be seen from the mathematics discussed supra for values of $a$ and $r$ for the side of the square detector marks 39 and 40 and the radius of the circular-scan modulation respectively.

The outputs of comparators 105 and 112 are conducted through leads 119 and 120 respectively to null detector 121. Null detector 121 may be a single AND circuit which provides an output signal only when all inputs are supplied. This null detector 121 provides an output only when $x$, $y$, $\theta$ and $M$ errors are corrected to within the errors predetermined by comparators 105 and 112.

Null detector 121 therefore outputs through lead 122 to flip-flop circuit 123 when alignment is achieved with predetermined accuracy. Flip-flop circuit 123 thereupon terminates the alignment sequence and locks the inputs to the electromagnets through integrators 67, 68, 95 and 96 by closing gates 70, 73, 98, 101 and 124 via leads 125, 126, 127, 128 and 129 respectively. Gates 70, 73, 98 and 101 stop any change in the outputs from the integrators; and gate 124 terminates the power supply to oscillator 62 through leads 130 and 131 so that the circular-scan modulation of the electron beams are stopped. The electron beams 48 is thus centered on marks 39 and 40, and the electron beam pattern is alignment with member 15 for the "exposure" sequence.

To restart the alignment sequence, and input is provided to flip-flop circuit 123 through lead 132 to reopen gates 70, 73, 98, 101, and 124.

In another aspect of the invention, the gain of the automatic alignment circuit is controlled and varied in proportion to the ratio of the fundamental to the fourth harmonic of the signal(s) from the detector mark(s) 39 and/or 40. The strength of fundamental signal at dual phase detectors 61 and 92 are dependent on the gains in the amplifiers, the electron induction sensitivity of the detector marks 39 and 40 and the energy of the electron beam 48. The sensitivity of the marks will vary from alignment to alignment due to such variations as oxide coating thickness, oxide doping, etc. The energy of the electron beam will reduce due to normal degradation of the photocathode sensitivity and of the light source.

Conversely, the strengths of the outputs from dual phase detectors 61 and 92 determine the speed of the alignment sequence and the stability of the alignment control near or at alignment. For best performance, it is desirable that the signal strengths always be in a certain range regardless of mark and photocathode conditions.

In general, a photocathode with low sensitivity will take longer to irradiate an electroresist and hence provide a longer time in which to attain alignment; but the same is not true of detector marks with low sensitivity. It is desirable therefore to make the alighment time as short as possible by using higher circuit gain to compensate for weak signals from the detector marks. However, if the gain is increased too much so as to provide rapid correction far from alignment, the situation close to alignment becomes unstable, particularly from the interaction that occurs between the deflection and rotation correction means. Therefore, most of the alignment time is normally expended when the beam pattern is far from alignment where the gain could be made high to reduce alignment time.

The present invention eliminates this difficulty by reducing the speed of the automatic alignment system as the ratio of the fundamental to the fourth harmonic of the signal at the dual phase detector is decreasing. The effect of variations in the signal on the rate of speed of positioning during alignment is substantially reduced because signal variations effect the fundamental and fourth harmonic equally. Far from alignment, where the fourth harmonic is small or non-existent, the gain of the signal to the phase detectors 61 and 92 is as high as possible consonant with the voltage levels that can be achieved in the circuit, e.g., 6 mils/sec. Close to null, as the fourth harmonic increases, the gain is made to decrease as the ratio of the fundamental to fourth harmonic of the signal decreases.

To accomplish this, the rectified fourth harmonic signals are supplied by leads 133 and 134 to divider circuits 60 and 91, respectively. The divider circuits 60 and 91 are analog devices which reduce the strength of the ac signal input to the phase detectors 61 and 92 directly with the ratio of the fundamental to fourth harmonic signals and inversely with the strength of the fourth harmonic signal. Divider circuits 60 and 91 do not increase the input signal but merely pass the signal through where the ratio is of such value that an increase would result by operation of the ratio on the input. The value of the input near alignment is therefore dependent primarily on the position of the electron beam with respect to the detector marks the same as the alignment sequence control. The situation is then ideal inasmuch as the signal driving the beam to alignment is dependent primarily on the distance from the alignment null irrespective of signal strengths from the detector marks.

While the present invention is particularly suited and has been specifically described to align an electron image projection system, it is distinctly understood that the invention may be otherwise variously embodied and used. For example, the invention may be used in the procedure for precision etching of selected areas of metal sheets to obtain desired shapes and patterns for various scientific and industrial applications.

What is claimed is:

1. A method for aligning a radiation beam of predetermined cross-section with a detector mark of like cross-section comprising the steps of:

a. moving the radiation beam in a predetermined overlapping pattern over at least a portion of the detector mark to produce a modulating signal from the detector mark proportional to said portion overlapped;

b. extracting from the modulating signal at least two frequency signals to electrically compare the frequency signals;

c. comparing relative amplitudes of the extracted fre-qudncy signals with each other to determine whether the amplitudes compare in a preselected alignment relationship; and d. changing position of the overlapping pattern over the detector mark and repeating steps (c) and (d) until the amplitudes of the extracted frequency signals compare in said preselected relationship.

2. A method of aligning a radiation beam of predetermined cross-section with a detector mark of like cross-section as set forth in claim 1 wherein:

the predetermined overlapping pattern is a curvilinear path selected from the group consisting of circular and elliptic.

3. A method for aligning a radiation beam of predetermined polygonal cross-section with a detector mark of like polygonal cross-section comprising the steps of:

a. moving the radiation beam in a predetermined overlapping pattern over at least a portion of the detector mark proportional to said portion overlapped;
b. extracting from the modulating signal the fundamental signal and the harmonic signal corresponding in number to sides of the polygonal cross-section;
c. comparing relative amplitudes of the extracted fundamental and harmonic signals with each other to determine whether the amplitudes compare in a preselected alignment relationship;
d. changing position of the overlapping pattern over the detector mark and repeating steps (c) and (d) until the amplitudes of the extracted signals compare in preselected relationship.

4. A method of aligning a radiation beam of predetermined polygonal cross-section with a detector mark of like polygonal cross-section as set forth in claim 3 wherein:

the predetermined cross-sections of the radiation beam and the detector mark are substantially square and the extracted harmonic signal is the fourth harmonic.

5. A method of aligning a radiation beam of predetermined polygonal cross-section with a detector mark of the polygonal cross-section as set forth in claim 3 wherein:

the predetermined overlapping pattern is a curvilinear path selected from the group consisting of circular and elliptic.

6. A method for aligning a radiation beam of predetermined cross-section with a detector mark of like cross-section as set forth in claim 1 comprising additionally:

e. changing position of the overlapping pattern over the detector mark at a controlled rate proportional to a ratio of the frequency signals extracted from the output signal as the preselected alignment relationship is approached.

7. Apparatus for automatically aligning an electron beam of predetermined cross-section with a detector mark of like cross-section comprising:

a. cathodic means capable of producing an electron beam of pre-determined cross-section;
b. a member spaced from the cathodic means having thereon a detector mark of predetermined cross-section of substantially similar dimensions to the electron beam capable of having at least portions thereof overlapped by the beam and producing an electric output signal proportional to said portions overlapped;
c. modulating means for moving the electron beam in a predetermined overlapping pattern over the detector mark to produce a modulated output signal from the detector mark;
d. electrical means for extracting at least two frequency signals from the modulated output signal to electrically compare the frequency signals;
e. electrical means for comparing relative amplitudes of the frequency signals with each other to determine whether the amplitudes compare in a preselected alignment relationship;
f. positioning means for automatically changing position of the overlapping pattern of the electron beam on the detector mark; and
g. electrical means for stopping the positioning means when the frequency signals compare in the preselected alignment relationship.

8. Apparatus for automatically aligning an electron beam of predetermined cross-section with a detector mark of like cross-section as set forth in claim 7 wherein:

the predetermined overlapping pattern is a curvilinear path selected from the group consisting of circular and elliptic.

9. Apparatus for automatically aligning an electron beam of predetermined cross-section with a detector mark of like cross-section comprising:

a. cathodic means capable of producing an electron beam of predetermined polygonal shape cross-section;
b. a member spaced from the cathodic means having thereon a detector mark of predetermined polygonal shape cross-section of substantially similar dimensions to the electron beam capable of having at least portions thereof overlapped by the beam and producing an electric output signal proportional to said portions overlapped;
c. modulating means for moving the electron beam in a predetermined overlapping pattern over the detector mark to produce a modulated output signal from the detector mark;
d. electrical means for extracting at least two frequency signals including the fundamental signal and the harmonic signal corresponding in number to sides of the polygonal cross-sections from the modulated output signal to electrically compare the fundamental and harmonic signals;
e. electrical means for comparing relative amplitudes of the fundamental and harmonic signals with each other to determine whether the amplitudes compare in a preselected alignment relationship;
f. positioning means for automatically changing position of the overlapping pattern of the electron beam on the detector mark; and
g. electrical means for stopping the positioning means when the fundamental and harmonic signals compare in the preselected alignment relationship.

10. Apparatus for automatically aligning an electron beam of predetermined cross-section with a detector mark of like cross-section as set forth in claim 9 wherein:

the predetermined cross-sections of the electron beam and the detector mark are substantially square and the harmonic signal is the fourth harmonic.

11. Apparatus for automatically aligning an electron beam of predetermined cross-section with a detector mark of like cross-section as set forth in claim 9 wherein:

the predetermined overlapping pattern is a curvilinear path selected from the group consisting of circular and elliptic.

12. Apparatus for automatically aligning an electron beam of predetermined cross-section with a detector mark of like cross-section as set forth in claim 7 comprising:

h. electrical means for automatically changing position by the positioning means at a controlled rate proportional to a ratio of two frequency signals as the preselected alignment relationship is approached.

13. Apparatus for automatically aligning an electron beam with a detector mark comprising:

a. cathodic means capable of producing an electron beam of predetermined cross-section;

b. a member spaced from the cathodic means having thereon a detector mark of predetermined cross-section of substantially similar dimensions to the electron beam capable of having at least portions thereof overlapped by the beam and producing an electric output signal proportional to said portions overlapped;

c. positioning means for automatically changing position of the overlapping pattern of the electron beam on the detector mark as a function of the output signals from the detector mark; and d. electrical means for automatically changing position by the positioning means at a controlled rate proportional to a ratio of two frequency signals extracted from the output signal as the ratio approaches a preselected value corresponding to alignment of the electron beam and the detector mark within an established tolerance.

* * * * *